(12) United States Patent
Kunberger

(10) Patent No.: US 11,780,506 B2
(45) Date of Patent: Oct. 10, 2023

(54) COMPONENT FOR A VEHICLE, VEHICLE PER SE AND METHOD FOR PRODUCING THE COMPONENT

(71) Applicant: Bayerische Motoren Werke Aktiengesellschaft, Munich (DE)

(72) Inventor: Jan-Mark Kunberger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 284 days.

(21) Appl. No.: 17/274,489

(22) PCT Filed: Jul. 29, 2019

(86) PCT No.: PCT/EP2019/070350
§ 371 (c)(1),
(2) Date: Mar. 9, 2021

(87) PCT Pub. No.: WO2020/052852
PCT Pub. Date: Mar. 19, 2020

(65) Prior Publication Data
US 2021/0309305 A1    Oct. 7, 2021

(30) Foreign Application Priority Data
Sep. 14, 2018  (DE) .................... 10 2018 215 683.2

(51) Int. Cl.
*B62D 29/00*  (2006.01)
(52) U.S. Cl.
CPC .................... *B62D 29/002* (2013.01)
(58) Field of Classification Search
CPC .............................. B62D 29/002; B62D 25/00

USPC ............................................... 296/187.01
See application file for complete search history.

(56) References Cited

U.S. PATENT DOCUMENTS

| 5,658,013 A | 8/1997 | Bees et al. |
| 5,931,474 A | 8/1999 | Chang et al. |
| 7,191,737 B2* | 3/2007 | Klein ............ C25B 9/17 123/3 |
| 2003/0194548 A1 | 10/2003 | McLeod et al. |
| 2009/0008173 A1 | 1/2009 | Hall et al. |
| 2010/0213001 A1 | 8/2010 | Hasler et al. |
| 2011/0079140 A1 | 4/2011 | Baseley |
| 2017/0028964 A1 | 2/2017 | Bierwirth |

(Continued)

FOREIGN PATENT DOCUMENTS

| CN | 1196704 A | 10/1998 |
| CN | 1646288 A | 7/2005 |

(Continued)

OTHER PUBLICATIONS

English translation of Chinese Office Action issued in Chinese Application No. 201980059315.4 dated Jul. 1, 2022 (nine (9) pages).

(Continued)

*Primary Examiner* — Pinel E Romain
(74) *Attorney, Agent, or Firm* — Crowell & Moring LLP

(57) ABSTRACT

A component for a vehicle that can be operated with a combustible operating gas has a first component element which has or forms an at least partially open or free cavity, and a second component element which is designed as a displacement component and at least partially fills the cavity of the first component element.

10 Claims, 1 Drawing Sheet

(56) References Cited

U.S. PATENT DOCUMENTS

2017/0087980 A1 3/2017 Arras et al.
2017/0096067 A1* 4/2017 Murata ............. H01M 8/04029
2017/0120738 A1 5/2017 Landgraf et al.

FOREIGN PATENT DOCUMENTS

| CN | 103180158 A | 6/2013 |
|---|---|---|
| CN | 106364478 A | 2/2017 |
| CN | 106457991 A | 2/2017 |
| CN | 106458013 A | 2/2017 |
| DE | 694 05 601 T2 | 1/1998 |
| DE | 10 2016 015 001 A1 | 6/2018 |
| EP | 1 591 224 A1 | 11/2005 |

OTHER PUBLICATIONS

International Search Report (PCT/ISA/210) issued in PCT Application No. PCT/EP2019/070350 dated Nov. 12, 2019 with English translation (four (4) pages).
German-language Written Opinion (PCT/ISA/237) issued in PCT Application No. PCT/EP2019/070350 dated Nov. 12, 2019 (five (5) pages).
German-language Search Report issued in German Application No. 10 2018 215 683.2 dated Jul. 22, 2019 with partial English translation (12 pages).

* cited by examiner

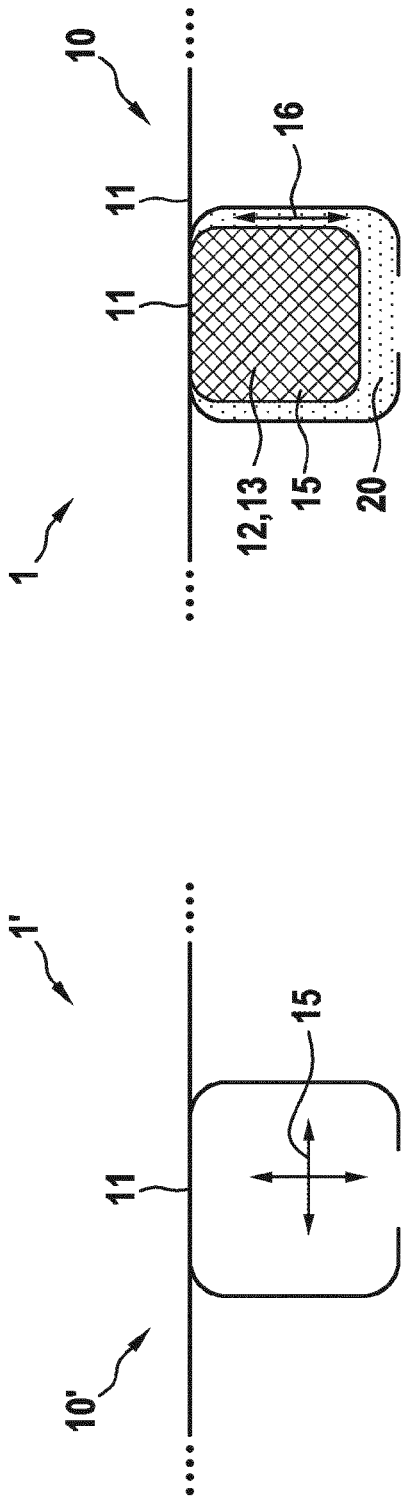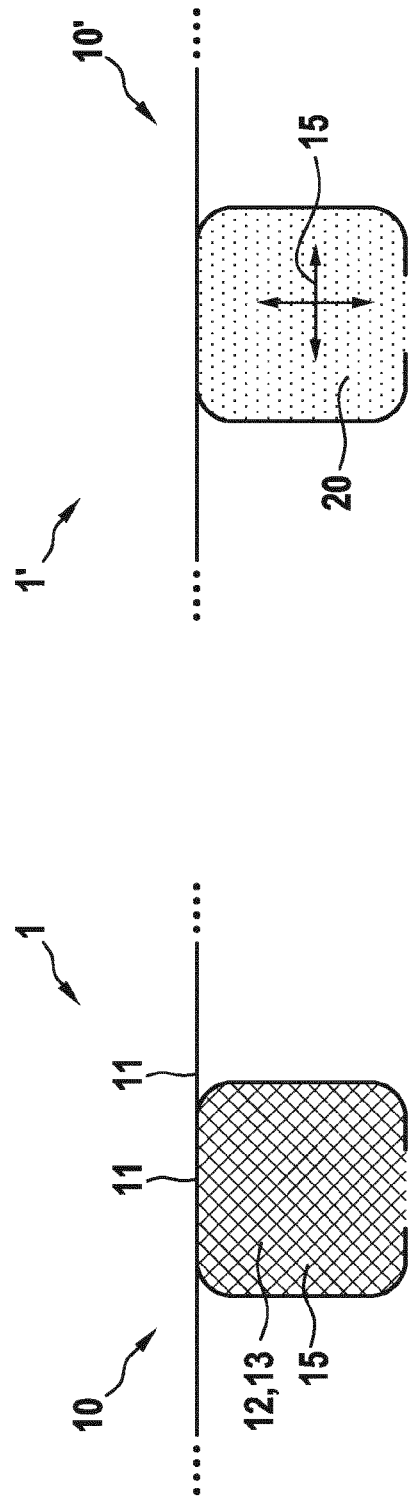

COMPONENT FOR A VEHICLE, VEHICLE PER SE AND METHOD FOR PRODUCING THE COMPONENT

BACKGROUND AND SUMMARY OF THE INVENTION

The present invention relates to a component for a vehicle which is operable with a combustible operating gas, to a vehicle per se, and to a method for producing the component.

Vehicles are known in which at least one assembly is operated with an operating gas. Such an operating gas may be a combustible gas. A problem arises in the case of combustible operating gases if significant volume fractions of operating gas collect in a cavity of components.

The use of sensors to detect significant volumes of operating gas together with the use of corresponding warning means is duly known. Such warning means are however cumbersome and do not eliminate the cause.

The invention is based on the object of providing a component for a vehicle which is operable with a combustible operating gas, a vehicle per se, and a method for producing such a component, in the case of which it is achieved using simple means that an ignition risk resulting from a collection of operating gases in cavities of manufactured and/or used components is reduced with regard to the collection of combustible operating gases.

The object on which the invention is based is achieved by a component, a vehicle equipped with the component, and a method for producing the component, according to the independent claims. The respective dependent claims relate to advantageous refinements.

According to a first aspect of the present invention, a component for a vehicle which is operable with a combustible operating gas is created. The component according to the invention is formed (i) with a first component element which has or forms an at least partially open or free cavity, and (ii) with a second component element, which is configured or formed as a displacement element and which at least partially fills the cavity of the first component element. By virtue of the fact that the second component element functions as a displacement component in the cavity of the first component element and, there, occupies a certain fraction of the free volume of the cavity, a smaller fraction of the free volume of the cavity is available for being filled in the event of a leakage of the operating gas. In this way, even in the event of an operating fault, the absolute quantity of operating gas collected in the cavity is reduced.

In the context of the present invention, an operating gas may also be understood to mean a substance mixture and, in particular, a gas mixture which has at least one combustible gaseous component. The operation of the underlying vehicle may be understood to mean any operation, that is to say the operation of any assembly of the vehicle in which the operating gas is used in a very general sense.

A particularly high level of safety is attained if, according to a preferred embodiment of the component according to the invention, the second component element completely or substantially completely fills the cavity of the first component element.

Here, substantially complete filling of the cavity of the first component element by the second component element can be understood to mean a degree of filling in the case of which the remaining free residual volume is entirely insignificant and/or immeasurable with regard to the risk of ignition, a deflagration or an explosion.

Furthermore, the specific residual volume that remains free in the cavity of the first component element can be set in relation to the specific operating gas, a mixture of the specific operating gas with the ambient atmosphere, for example air, and the corresponding ignitability of the gas or of the gas mixture.

Accordingly, it is particularly advantageous if, according to another preferred exemplary embodiment of the component according to the invention, the second component element fills the cavity of the first component element apart from an open or free residual volume which is non-critical with regard to the underlying operating gas.

In particular, it may be provided that an open or free residual volume which is not filled in the cavity of the first component element by the second component element:
- amounts to less than 10%, preferably less than 5% and more preferably less than 1% of the volume of the cavity of the first component element, and/or
- encompasses less than 2000 $cm^3$, preferably less than 1000 $cm^3$ and more preferably less than 500 $cm^3$.

This may also be made dependent on the type and the nature of the operating gas used, be it hydrogen, natural gas or some other gas mixture.

A particularly high level of safety is attained if, according to another embodiment of the component according to the invention, the second component element is formed with or from a foam material, a plastics material, a polyurethane material, a polystyrene material, a mechanically and/or acoustically damping material, a material which absorbs mechanical work and/or mechanically supports the first component element, a material with low flammability or a non-flammable material, a material which is inert with respect to the operating gas and/or an atmosphere of the operating environment, a material which is dimensionally stable during installation, a material which is not dimensionally stable during installation, and/or a material which is liquid and which cures in air or in a process gas.

It is alternatively or additionally contemplated for the second component element to be formed in the manner of a balloon which can be filled with an inert gas and which, when filled having been introduced into a cavity, fills the cavity so as to partially or completely fill, and thus at least restrict, the available free volume of the cavity.

This means in particular that, aside from the function of the second component element as a displacement means, it is also possible for additional mechanical functions to be implemented, for example in the context of a supporting function for the first component element which forms the cavity and/or in the context of a damper, should a deflagration or explosion nevertheless occur.

Particularly flexible use of the component according to the invention arises, for example with regard to maintenance and repair of the underlying vehicle, if the second component element is designed to be reversibly installable, in particular by releasable fastening means.

In the case of a foaming element of a cavity by means of a curing foam material, consideration may for example be given to dissolving the introduced foam in the cavity, and/or breaking said foam down into its constituents, by means of a solvent, for example in the form of a liquid, a vapor or gas, and removing said foam from the cavity in order for said cavity to then undergo inspection, maintenance and the like.

According to a further aspect of the present invention, a vehicle per se is also created, in particular in the form of a gas-operated motor vehicle.

The vehicle according to the invention is formed with an assembly which can be driven with an operating gas or with an element containing combustion gas, and with a component designed according to the invention.

The invention lends itself to basically all fields of use in which a component forms an at least partially open cavity which can in any way become a collecting point for operating gas.

In particular, it is envisaged that the component is formed at least as part of a body, as part of a space of the assembly which is operable with the operating gas, as part of an engine compartment or in the vicinity of an engine and/or as part of a tank or in the vicinity of the tank of the operating gas.

According to a further aspect of the present invention, a method for producing a component for a vehicle which is operable with a combustible operating gas is also proposed.

The method according to the invention has, inter alia, the following steps:
providing a first component element, which has or forms an at least partially open or free cavity,
providing a second component element or a preform thereof,
attaching the second component element or the preform on and/or in the first component element such that the second component element or the preform functions so as to be configured as a displacement element and at least partially fills the cavity of the first component element.

A preform of the second component element may for example be understood to mean a liquid or a liquid mixture or some other form of substance mixture which is applied into the cavity and expands in volume and/or cures, in order to fill the cavity, over the course of time, upon contact with atmospheric oxygen and/or some other gas, under the action of heat and/or by irradiation with UV light and/or other, for example electromagnetic, vibrations or the like. Only after the transition from the preform into the final state is the second component element finally practically provided.

In one refinement of the method according to the invention, it is advantageously possible for a conventional component to be used as first component element.

Retrofitting of existing components or vehicles is thus also conceivable and possible on the basis of the knowledge according to the invention.

Further details, features and advantages of the invention will emerge from the following description and from the figures.

BRIEF DESCRIPTION OF THE DRAWINGS

FIG. 1 shows, in a partially sectional side view, a conventional component in conjunction with a conventional vehicle, which can function as a starting point for the concept according to the invention.

FIGS. 2 and 3 show, in partially sectional side views, two embodiments of the component according to the invention.

FIG. 4 shows, in a partially sectional side view, a conventional component in an operating state in which a certain quantity of an operating gas or operating gas mixture has collected in a cavity.

DETAILED DESCRIPTION OF THE DRAWINGS

Below, exemplary embodiments and the technical background of the invention will be described in detail with reference to FIGS. 1 to 4. Identical and equivalent parts and elements, and parts and elements of identical or equivalent action, will be denoted by the same reference designations. The detailed description of the denoted parts and elements will not be given at every case of their occurrence.

The illustrated features and further characteristics may be isolated from one another in any form and combined with one another as desired without departing from the core of the invention.

FIG. 1 shows, in a partially sectional side view, a conventional component 10' in conjunction with a conventional vehicle 1', which can function as a starting point for the concept according to the invention.

Here, the conventional component 10' of the conventional vehicle 1' comprises exclusively a first component element 11 which, in a particular region, forms a cavity 15 which is at least partially open and/or opened to the surroundings, such that operating gas 20 released from the surroundings can enter and collect in the cavity, as illustrated in conjunction with FIG. 4.

FIG. 4 thus shows, in a partially sectional side view, a conventional component 10' in an operating state in which a certain quantity of an operating gas 20 has collected in the cavity 15, wherein the collected quantity of operating gas 20 may, owing to the absolute quantity or owing to the concentration, be critical with regard to risks associated with a combustion, deflagration or explosion.

In order to reduce or eliminate the risks associated therewith, the present invention as illustrated by way of example in conjunction with FIGS. 2 and 3 was devised.

FIGS. 2 and 3 show two embodiments of the component 10 according to the invention in partially sectional side views.

By contrast to the conventional component 10' and state illustrated in FIG. 1, in which the cavity 15, which can also be referred to as the interior of the first component element 11, is completely free and unfilled, such that, in the hazardous case, the state illustrated in FIG. 4 with complete filling with the operating gas 20 can occur, it is the case in FIGS. 2 and 3 that the cavity 15 of the first component element 11 is, in FIG. 2, filled partially, specifically apart from a residual volume 16, by the second component element 12 composed of the displacement material 13. In the embodiment as per FIG. 3, the filling is even complete or substantially complete, such that a free residual volume 16 is no longer present or is at least immeasurable.

The structure according to the invention, specifically the creation of a component 10 composed of a first component element 11 with cavity 15 and the partial or complete filling of the cavity 15 with a second component element 12, may also be used as a retrofit kit, for example in the form of a transition from the conventional state as per FIG. 1 by partial or complete filling of the cavity 15 with a displacement material 13, specifically in order to attain the final states according to the invention shown in FIG. 2 or 3.

These and further features and characteristics of the present invention will be discussed in more detail on the basis of the following explanations.

In the context of the present invention, consideration has been given to so-called gas vehicles. A gas vehicle is to be understood to mean a vehicle 1 in which at least one assembly is operated with a gas 20, for example hydrogen or natural gas or the like. The assembly need not be a part of the vehicle drive, although this may be a possible main use. In this context, the vehicle may then also be referred to as a hydrogen vehicle or natural gas vehicle depending on the driving gas or operating gas 20.

During the operation of gas vehicles, gas leakages are particularly critical if the operating gas 20, for example in the context of a fuel, that is to say for example $H_2$ or NG, collects in cavities of the vehicle 1 and in particular mixes with the ambient gas, for example air, because a fire may develop, or even an explosion may occur, if a critical concentration and/or quantity forms.

In order to identify critical fuel concentrations and/or fuel quantities, use is often made of sensors which can measure the volumetric fuel concentration in a cavity 15.

Cavities 15, in particular those with a large volume, are thus safety-critical structural spaces in vehicles 1 with a gaseous operating medium, in particular with gaseous fuel.

However, even if a critical fuel concentration is measured, there is conventionally no suitable protective measure because, for this purpose, it would for example be necessary to additionally install a separate active ventilation means in order, for example, to dilute a critical mixture which is present.

According to the invention, safety-relevant cavities 15 on and/or in a vehicle 1 are, during the course of the manufacture of the vehicle, reduced in terms of their free volume to a non-critical dimension for example by means of very lightweight volume components and/or by means of a foam 12, 13.

Here, volume components 12 and/or foams 13 provided according to the invention—in particular in the context of so-called second component elements 12—preferably have one or more of the characteristics listed below:

impermeability to the gas in question, for example to a gaseous fuel,
a low weight,
low material, manufacturing and/or installation costs,
possibility of simple and/or fast installation,
possibility of simple and/or fast uninstallation, and
inert characteristics with respect to the materials situated in the surroundings.

If the volume components 12 are composed of foam 13, said foam may for example be composed of large and/or gas-impermeable pores.

Furthermore, a foam 13 can also be particularly easily removed again in order for repair work to be carried out or in the event of maintenance.

A removal of a foam material 13 may be performed for example by dissolution—for example by means of irradiation, for example with light, and/or by application of a gas as solvent.

It would also be conceivable for the foam to be warmed by external electromagnetic stimulation such that said foam decomposes. This could be achieved for example by incorporation of a molecule which can be stimulated at its resonance frequency by external means.

According to the invention, the free volume of critical vehicle cavities 15 is reduced to a non-critical dimension. The collection of fuel gases 20 is reliably reduced or even prevented.

According to the invention, no sensor arrangement or other protective measure is required in order to control a critical combustion gas mixture in a cavity 15. In this way, according to the invention, the susceptibility of sensor-based systems to faults is avoided. Also, according to the invention, costs that are incurred in the case of sensor-based systems in order to achieve the required integrity are avoided.

By means of this avoidance measure, the collection of critical gas mixtures in cavities 15 is prevented.

LIST OF REFERENCE DESIGNATIONS

1 Vehicle according to the invention
1' Conventional vehicle
10 Component according to the invention
10' Conventional component
11 (First) component element
12 (Second) component element, displacement element
13 Foam material, displacement material
15 Cavity, interior
16 Residual volume
20 Operating gas/critical gas mixture

What is claimed is:

1. A vehicle component of a hydrogen vehicle or a natural gas vehicle that is operated with a combustible operating gas, comprising:
    a first component element which has or forms an at least partially open or free cavity, wherein the combustible operating gas in a surrounding of the first component element is enterable and collectable in the cavity; and
    a second component element which is formed as a displacement element and which at least partially fills the cavity of the first component element such that no free residual volume in the cavity results or such that combustible operating gas collected in a free residual volume in the cavity is no longer combustible.

2. The vehicle component according to claim 1, wherein the free residual volume:
    (i) amounts to less than 10% of a volume of the cavity of the first component element, and/or
    (ii) encompasses less than 2000 $cm^3$.

3. The vehicle component according to claim 1, wherein the free residual volume:
    (i) amounts to less than 1% of a volume of the cavity of the first component element, and/or
    (ii) encompasses less than 500 $cm^3$.

4. The vehicle component according to claim 1, wherein the second component element is formed with or from at least one of:
    a foam material,
    a plastics material,
    a polyurethane material,
    a polystyrene material,
    a mechanically and/or acoustically damping material,
    a material which absorbs mechanical work and/or mechanically supports the first component element,
    a material with low flammability or a non-flammable material,
    a material which is inert with respect to the operating gas and/or an atmosphere of the operating environment,
    a material which is dimensionally stable during installation,
    a material which is not dimensionally stable during installation, or
    a material which is liquid and which cures in air or in a process gas.

5. The vehicle component according to claim 1, wherein the second component element is designed to be reversibly installable.

6. The vehicle component according to claim 1, wherein the second component element is releasably fastened in the cavity of the first component.

7. A hydrogen vehicle or a natural gas vehicle, comprising:
    an assembly which can be driven with a combustible operating gas or with an element containing the combustible operating gas gas; and
    a component according to claim 1.

8. The vehicle according to claim 7, wherein
    the component is formed at least as part of a body, as part of a space of the assembly which is operable with the combustible operating gas, as part of an engine compartment or in a vicinity of an engine, and/or as part of a tank or in a vicinity of the tank of the combustible operating gas.

9. A method for producing a component of a hydrogen vehicle or a natural gas vehicle that is operated with a combustible operating gas, the method comprising the steps of:

providing a first component element, which has or forms an at least partially open or free cavity, wherein the combustible operating gas in a surrounding of the first component element is enterable and collectable in the cavity;

providing a second component element or a preform thereof;

attaching the second component element or the preform on and/or in the first component element such that the second component element or the preform functions so as to be configured as a displacement element and at least partially fills the cavity of the first component element such that no free residual volume in the cavity results or such that combustible operating gas collected in a free residual volume in the cavity is no longer combustible.

10. The method according to claim 9, wherein a conventional vehicle component is provided as the first component element.

* * * * *